J. I. MISENER.
CONDUIT SEAL.
APPLICATION FILED JUNE 18, 1918.

1,351,724. Patented Aug. 31, 1920.

INVENTOR
John I. Misener
BY
Himself.
ATTORNEY

UNITED STATES PATENT OFFICE.

JOHN I. MISENER, OF SYRACUSE, NEW YORK, ASSIGNOR TO MISENER & IRVING MANUFACTURING CO. INC., OF SYRACUSE, NEW YORK, A CORPORATION OF NEW YORK.

CONDUIT-SEAL.

1,351,724.  Specification of Letters Patent.  Patented Aug. 31, 1920.

Application filed June 18, 1918. Serial No. 240,622.

*To all whom it may concern:*

Be it known that I, JOHN I. MISENER, of Syracuse, in the county of Onondaga and State of New York, have invented a certain new and useful Conduit-Seal, of which the following is a specification.

This invention has for its object a particularly cheap, simple and highly efficient conduit seal for use during construction work, in connection with electric conduits for preventing moisture, dirt, stones or any foreign substance from accumulating in said conduit, thereby preventing the wires from being drawn therethrough, and which can be readily removed without first disassembling the electrical parts; and the invention consists of the novel combination of features and constructions hereinafter set forth and claimed.

In describing this invention, reference is had to the accompanying drawing in which like characters designate corresponding parts in all the views.

Figure 1:
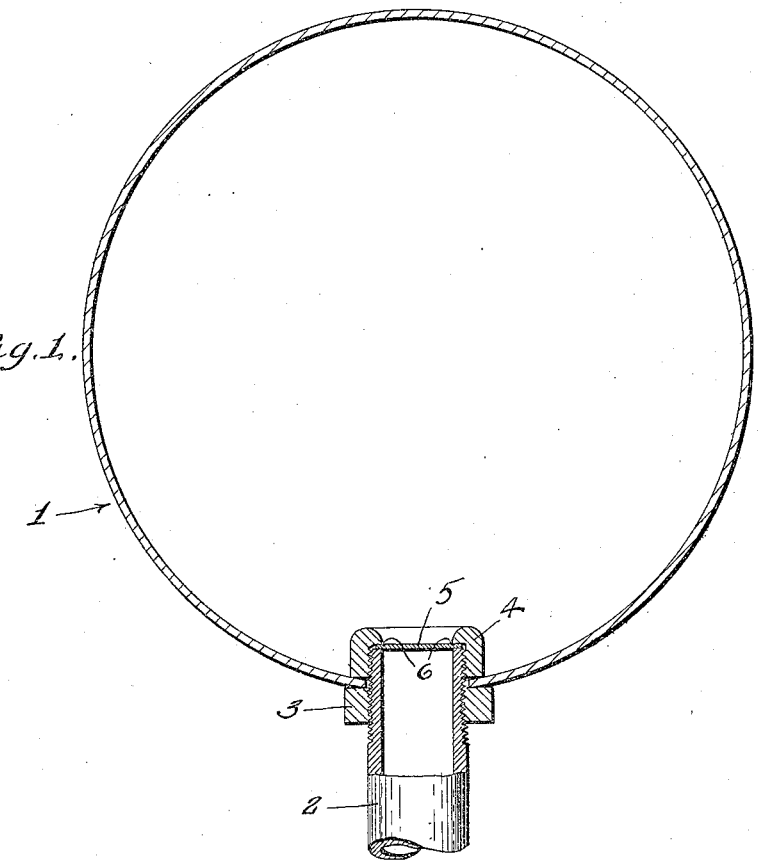
Figure 1 is a sectional view of a conduit outlet box showing a portion of a conduit with my seal clamped in position.
Figure 2:
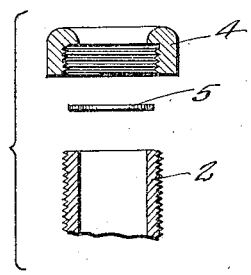
Fig. 2 is a view similar to Fig. 1, parts being removed, and the remaining parts being separated.
Figure 3:
Fig. 3 is a plan view of my seal.

This conduit seal comprises generally a conduit outlet box, an electric conduit extending through one wall thereof, means for securing said conduit in position including a bushing, provided with an annular internal flange extending over the end edge of the conduit for preventing abrasion of the wires drawn therethrough, and a flat disk of puncturable insulating material for the opening at the end of the conduit adjacent said collar, the disk being weakened within the outer marginal edge and said marginal edge being held between the flange and the end of the conduit.

1 is a conduit outlet box and 2 is an electric conduit. The conduit as here shown passes through an opening in the box 1 and is fixed thereto by means of a lock nut 3 and a collar or bushing 4 threading on the end of the conduit 2 and against opposite sides of one of the walls of the box 1.

The construction thus far described is of the usual type, the bushing being one of the requirements of the Fire Underwriters and is provided with the usual internal flange having a rounded surface for preventing the abrasion of the wires when the same are being drawn therethrough.

5 is the seal and as here shown comprises a flat disk of puncturable insulating material, such as paper, fiber, etc., the marginal edge thereof being clamped between the threaded end of the conduit 2 and the internal flange of the collar or bushing 4.

As the seal is necessarily of larger diameter than the inside of the conduit, and it is desirable to puncture the same evenly and readily, when the wires are to be drawn therethrough, said seal is scored or otherwise weakened, as at 6, near the marginal edge thereof, the scoring being of the same diameter as the inside of the conduit, thereby permitting the seal to be readily and evenly opened to the exact size of the inner diameter of said conduit.

In use, the end of the conduit 2 is placed through the wall of the outlet box 1, the seal is placed over the end thereof and the bushing 4 screwed tight, the lock nut 3 is then tightened. When the wires are to be drawn, the seal is readily cut or punctured around the scored or weakened portion, thereby giving a free passage for the wires the exact size of the inner diameter of the conduit.

As will be obvious to those skilled in the art, a seal, as described can be readily opened without first removing the bushing, and even though the seal should drop into the conduit, no harm would be done as the material used would not cut the insulation on the wires, and is an insulation itself.

What I claim is:—

1. The combination of a conduit outlet box, a conduit extending through one wall thereof, means for securing said conduit in position including a bushing threaded upon the end of the conduit and bearing against the inner face of the box wall, an annular internal flange provided on the bushing and extending over the end edge of the conduit and a flat disk of puncturable insulating material having its marginal edge held between the end edge of the conduit and the annular internal flange of the bushing.

2. The combination of a conduit outlet box, a conduit extending through one wall thereof, means for securing said conduit in position including a bushing threaded upon the end of the conduit and bearing against the inner face of the box wall, an annular internal flange provided on the bushing and extending over the end edge of the conduit, a flat disk of puncturable insulating material having a circular scoring within its marginal edge of the same diameter as the inside of the conduit and having its marginal edge held between the end edge of the conduit and the annular internal flange of the bushing.

In testimony whereof, I have hereunto signed my name in the presence of two attesting witnesses, at Syracuse, in the county of Onondaga, and State of New York, this 12th day of June, 1918.

JOHN I. MISENER.

Witnesses:
CHAS. H. YOUNG,
G. B. PICKARD.